(12) United States Patent
Nguyen

(10) Patent No.: US 12,314,626 B2
(45) Date of Patent: *May 27, 2025

(54) ENABLE INTERACTION BETWEEN A USER AND AN AGENT OF A 5G WIRELESS TELECOMMUNICATION NETWORK USING AUGMENTED REALITY GLASSES

(71) Applicant: T-Mobile USA, Inc., Bellevue, WA (US)

(72) Inventor: Phi Nguyen, Lacey, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,240

(22) Filed: Dec. 13, 2023

(65) Prior Publication Data

US 2024/0111476 A1 Apr. 4, 2024

Related U.S. Application Data

(63) Continuation of application No. 17/843,469, filed on Jun. 17, 2022, now Pat. No. 11,886,767.

(51) Int. Cl.
*G06F 3/00* (2006.01)
*G06F 3/01* (2006.01)
(Continued)

(52) U.S. Cl.
CPC .......... *G06F 3/1454* (2013.01); *G06F 3/011* (2013.01); *G06F 21/32* (2013.01); *G06F 21/602* (2013.01);
(Continued)

(58) Field of Classification Search
None
See application file for complete search history.

(56) References Cited

U.S. PATENT DOCUMENTS 7,302,397 B1 11/2007 Hein et al.
7,587,753 B2 9/2009 Morris et al.
(Continued)

FOREIGN PATENT DOCUMENTS

CN 103092320 A 5/2013
CN 103781522 B 6/2016
(Continued)

OTHER PUBLICATIONS

ETSI Multi-access Edge Computing (MEC), "Edge Platform Application Enablement" ETSI GS MEC 011 V2.1.1 (Nov. 2019), 76 pages.

(Continued)

*Primary Examiner* — Martin Mushambo
(74) *Attorney, Agent, or Firm* — Perkins Coie LLP

(57) ABSTRACT

The disclosed system receives a request from a user to interact with an agent of a wireless telecommunication network including a 5G wireless telecommunication network or higher generation wireless telecommunication network. The system determines whether the user is associated with a first AR/VR device including a camera configured to capture an object proximate to the first AR/VR device and a display configured to show a virtual object, which is not part of a surrounding associated with the first AR/VR device. Upon determining that the user is associated with the first AR/VR device, the system creates a high-bandwidth communication channel over the wireless telecommunication network between the first AR/VR device and a second AR/VR device and a virtual room enabling the user and the agent to share visual information over the high-bandwidth communication channel.

20 Claims, 10 Drawing Sheets

(51) Int. Cl.

| | | |
|---|---|---|
| *G06F 3/14* | (2006.01) | |
| *G06F 21/32* | (2013.01) | |
| *G06F 21/60* | (2013.01) | |
| *G06V 30/19* | (2022.01) | |
| *G06V 30/418* | (2022.01) | |
| *G06V 30/42* | (2022.01) | |
| *H04W 72/04* | (2023.01) | |

(52) U.S. Cl.
CPC ...... *G06V 30/19147* (2022.01); *G06V 30/418* (2022.01); *G06V 30/42* (2022.01); *H04W 72/04* (2013.01)

(56) References Cited

U.S. PATENT DOCUMENTS

| | | |
|---|---|---|
| 8,069,472 B2 | 11/2011 | Morris et al. |
| 8,473,432 B2 | 6/2013 | Anerousis et al. |
| 8,493,353 B2 | 7/2013 | Blanchflower et al. |
| 8,972,798 B2 | 3/2015 | Kakadia et al. |
| 9,153,074 B2 | 10/2015 | Zhou et al. |
| 9,467,583 B2 | 10/2016 | Roulland et al. |
| 9,588,730 B2 | 3/2017 | Mitchell |
| 9,606,992 B2 | 3/2017 | Geisner et al. |
| 9,607,436 B2 | 3/2017 | Malamud et al. |
| 9,607,438 B2 | 3/2017 | Blanchflower et al. |
| 9,639,964 B2 | 5/2017 | Fein et al. |
| 9,646,400 B2 | 5/2017 | Weerasinghe |
| 9,652,894 B1 | 5/2017 | Weekly et al. |
| 9,660,862 B2 | 5/2017 | Ko et al. |
| 9,685,005 B2 | 6/2017 | Kjallstrom et al. |
| 9,697,676 B2 | 7/2017 | Arumugam et al. |
| 9,723,502 B2 | 8/2017 | Gupta et al. |
| 9,746,913 B2 | 8/2017 | Lam et al. |
| 9,754,397 B1 | 9/2017 | Piemonte et al. |
| 9,754,416 B2 | 9/2017 | Kamhi et al. |
| 9,824,501 B2 | 11/2017 | Soon-shiong |
| 9,836,736 B1 | 12/2017 | Neale et al. |
| 9,836,888 B2 | 12/2017 | Skidmore |
| 9,875,600 B2 | 1/2018 | Arumugam et al. |
| 9,886,162 B2 | 2/2018 | Berelejis et al. |
| 9,886,786 B2 | 2/2018 | Zamer |
| 9,891,884 B1 | 2/2018 | Baughman et al. |
| 9,898,872 B2 | 2/2018 | Mitchell |
| 9,916,002 B2 | 3/2018 | Petrovskaya et al. |
| 9,928,569 B2 | 3/2018 | Bean et al. |
| 9,933,855 B2 | 4/2018 | Ferens et al. |
| 9,946,963 B2 | 4/2018 | Samara et al. |
| 9,953,350 B2 | 4/2018 | Pugazhendhi et al. |
| 9,953,462 B2 | 4/2018 | Ur et al. |
| 10,019,302 B2 | 7/2018 | Nguyen et al. |
| 10,037,077 B2 | 7/2018 | Auten et al. |
| 10,134,084 B1 | 11/2018 | Gabriele et al. |
| 10,148,819 B2 | 12/2018 | Yokel et al. |
| 10,157,504 B1 | 12/2018 | Jain |
| 10,163,269 B2 | 12/2018 | Hiranandani et al. |
| 10,176,458 B2 | 1/2019 | Allan et al. |
| 10,198,620 B2 | 2/2019 | Guo et al. |
| 10,319,128 B2 | 6/2019 | Billi-duran et al. |
| 10,331,874 B1 | 6/2019 | Benkreira et al. |
| 10,360,735 B1 | 7/2019 | Reeder et al. |
| 10,370,939 B2 | 8/2019 | Gopala Reddy Sunanda et al. |
| 10,388,075 B2 | 8/2019 | Schmirler et al. |
| 10,410,428 B1 | 9/2019 | Reeder et al. |
| 10,489,231 B1 | 11/2019 | Gabay et al. |
| 10,504,292 B1 | 12/2019 | Goodsitt et al. |
| 10,719,989 B2 | 7/2020 | Stahl et al. |
| 10,726,629 B2 | 7/2020 | Hiranandani et al. |
| 10,748,003 B2 | 8/2020 | Bastide et al. |
| 10,769,410 B2 | 9/2020 | Guo et al. |
| 10,789,475 B2 | 9/2020 | Yin et al. |
| 10,885,713 B2 | 1/2021 | Liao et al. |
| 10,950,060 B2 | 3/2021 | Hiranandani et al. |
| 10,951,764 B2 | 3/2021 | Yokel et al. |
| 10,957,083 B2 | 3/2021 | Du |
| 10,963,937 B1 | 3/2021 | Le Chevalier et al. |
| 11,010,981 B2 | 5/2021 | Goodsitt et al. |
| 11,037,116 B2 | 6/2021 | Sinha et al. |
| 11,037,225 B2 | 6/2021 | Tang et al. |
| 11,055,919 B2 | 7/2021 | Nattinger et al. |
| 11,062,516 B2 | 7/2021 | Greenberg et al. |
| 11,151,792 B2 | 10/2021 | Nattinger et al. |
| 11,159,771 B2 | 10/2021 | Schmirler et al. |
| 11,165,837 B2 | 11/2021 | Escudero et al. |
| 11,178,028 B1 | 11/2021 | Maseedu |
| 11,205,306 B2 | 12/2021 | Soryal et al. |
| 11,210,854 B2 | 12/2021 | Barnett et al. |
| 11,297,513 B2 | 4/2022 | Agarwal et al. |
| 2002/0007362 A1 | 1/2002 | Collins et al. |
| 2005/0086248 A1 | 4/2005 | Atchison |
| 2011/0187745 A1 | 8/2011 | Kang et al. |
| 2011/0316845 A1 | 12/2011 | Roberts et al. |
| 2012/0053967 A1 | 3/2012 | Roberts et al. |
| 2012/0101952 A1* | 4/2012 | Raleigh ............... H04L 12/1417 709/223 |
| 2012/0150632 A1 | 6/2012 | Fan et al. |
| 2013/0010068 A1 | 1/2013 | Tiernan et al. |
| 2013/0060653 A1* | 3/2013 | Sharkey ............... H04L 69/321 709/228 |
| 2013/0178257 A1 | 7/2013 | Langseth |
| 2015/0103097 A1 | 4/2015 | Li |
| 2016/0358383 A1 | 12/2016 | Gauglitz et al. |
| 2017/0103440 A1 | 4/2017 | Xing et al. |
| 2017/0201850 A1* | 7/2017 | Raleigh ................. H04W 4/50 |
| 2017/0310542 A1 | 10/2017 | Nair et al. |
| 2018/0040166 A1 | 2/2018 | Jayaraj et al. |
| 2018/0082476 A1 | 3/2018 | Kline et al. |
| 2018/0108079 A1 | 4/2018 | Traub |
| 2018/0131810 A1 | 5/2018 | Yokel |
| 2019/0373443 A1* | 12/2019 | Palaniappan ......... H04W 48/18 |
| 2020/0143238 A1 | 5/2020 | Ramnath et al. |
| 2020/0284938 A1 | 9/2020 | Chaturvedi et al. |
| 2020/0374181 A1 | 11/2020 | Stenberg et al. |
| 2020/0387804 A1 | 12/2020 | Mathur et al. |
| 2021/0056187 A1 | 2/2021 | Taylor et al. |
| 2021/0152584 A1 | 5/2021 | Chakravarty et al. |
| 2021/0192819 A1 | 6/2021 | Du |
| 2021/0201029 A1 | 7/2021 | Ju et al. |
| 2021/0245043 A1 | 8/2021 | Shriram et al. |
| 2021/0247846 A1 | 8/2021 | Shriram et al. |
| 2021/0304513 A1 | 9/2021 | Greenberg et al. |
| 2021/0366061 A1 | 11/2021 | Lerick et al. |
| 2021/0397495 A1 | 12/2021 | Prakash et al. |
| 2021/0399972 A1 | 12/2021 | Nguyen et al. |
| 2021/0406787 A1 | 12/2021 | Zittel et al. |
| 2022/0086069 A1 | 3/2022 | Maseedu |
| 2022/0088397 A1 | 3/2022 | Patnaikuni et al. |
| 2022/0114794 A1 | 4/2022 | Soryal et al. |
| 2022/0157023 A1 | 5/2022 | Wu et al. |
| 2023/0105621 A1 | 4/2023 | Karri et al. |

FOREIGN PATENT DOCUMENTS

| | | |
|---|---|---|
| CN | 105278519 B | 4/2018 |
| CN | 107870669 A | 4/2018 |
| CN | 108806071 A | 11/2018 |
| CN | 109154824 A | 1/2019 |
| CN | 109247029 A | 1/2019 |
| CN | 103207565 B | 6/2019 |
| CN | 109858021 A | 6/2019 |
| CN | 104662536 B | 8/2019 |
| CN | 105283834 B | 9/2019 |
| CN | 107111365 B | 10/2019 |
| CN | 110244677 B | 3/2020 |
| CN | 108519814 B | 6/2020 |
| CN | 111402426 A | 7/2020 |
| CN | 112075055 A | 12/2020 |
| CN | 112118279 A | 12/2020 |
| CN | 112119386 A | 12/2020 |
| CN | 112291707 A | 1/2021 |
| CN | 112598938 A | 4/2021 |
| CN | 109218306 B | 5/2021 |
| CN | 112955970 A | 6/2021 |
| CN | 110352595 B | 8/2021 |

(56) References Cited

FOREIGN PATENT DOCUMENTS

| | | |
|---|---|---|
| CN | 113445987 A | 9/2021 |
| CN | 110138848 B | 11/2021 |
| DE | 102013210789 A1 | 12/2014 |
| DE | 102014118910 A1 | 7/2015 |
| DE | 102015109203 A1 | 12/2015 |
| DE | 202014010940 U1 | 1/2017 |
| DE | 202017105864 U1 | 1/2018 |
| DE | 102016118647 B4 | 12/2018 |
| DE | 102015100911 B4 | 4/2019 |
| DE | 102019200533 A1 | 7/2019 |
| DE | 112016007223 T5 | 7/2019 |
| DE | 102019102866 A1 | 8/2019 |
| DE | 102019104950 A1 | 8/2019 |
| DE | 112015003302 B4 | 8/2019 |
| DE | 102018203865 A1 | 9/2019 |
| DE | 102019114720 A1 | 5/2020 |
| DE | 112018004220 T5 | 5/2020 |
| DE | 102019131372 A1 | 6/2020 |
| DE | 112013006286 B4 | 2/2021 |
| DE | 112020000054 T5 | 3/2021 |
| DE | 112018008032 T5 | 6/2021 |
| DE | 102021109179 A1 | 12/2021 |
| DE | 102013222322 B4 | 1/2022 |
| DE | 102020117985 B4 | 1/2022 |
| EP | 2324459 A1 | 5/2011 |
| EP | 2778924 A1 | 9/2014 |
| EP | 2801065 A1 | 11/2014 |
| EP | 3140761 A1 | 3/2017 |
| EP | 3268900 A1 | 1/2018 |
| EP | 3343491 A1 | 7/2018 |
| EP | 3417307 A1 | 12/2018 |
| EP | 3465459 A1 | 4/2019 |
| EP | 3465597 A1 | 4/2019 |
| EP | 3625658 A1 | 3/2020 |
| EP | 3702944 A1 | 9/2020 |
| EP | 3707668 A1 | 9/2020 |
| EP | 3747157 A1 | 12/2020 |
| EP | 3300005 B1 | 6/2021 |
| EP | 3841560 A2 | 6/2021 |
| EP | 3318944 B1 | 7/2021 |
| EP | 3852893 A1 | 7/2021 |
| EP | 3462622 B1 | 11/2021 |
| EP | 3944060 A1 | 1/2022 |
| EP | 3657733 B1 | 2/2022 |
| JP | 2006507778 A | 3/2006 |
| JP | 2009075828 A | 4/2009 |
| JP | 4797297 B2 | 8/2011 |
| JP | 2016510456 A | 4/2016 |
| JP | 5974226 B2 | 7/2016 |
| JP | 6158221 B2 | 6/2017 |
| JP | 6192817 B2 | 8/2017 |
| JP | 2018049010 A | 3/2018 |
| JP | 6317339 B2 | 4/2018 |
| JP | 2018073268 A | 5/2018 |
| JP | 2018521385 A | 8/2018 |
| JP | 2018525696 A | 9/2018 |
| JP | 6426161 B2 | 11/2018 |
| JP | 2018534011 A | 11/2018 |
| JP | 2019121362 A | 7/2019 |
| JP | 2019523929 A | 8/2019 |
| JP | 2020515933 A | 5/2020 |
| JP | 2020521217 A | 7/2020 |
| JP | 2021509206 A | 3/2021 |
| JP | 6869341 B2 | 4/2021 |
| JP | 7021361 B2 | 2/2022 |
| JP | 7041194 B2 | 3/2022 |
| KR | 100357295 B1 | 10/2002 |
| KR | 20030022775 A | 3/2003 |
| KR | 20050010717 A | 1/2005 |
| KR | 100679362 B1 | 2/2007 |
| KR | 101107394 B1 | 1/2012 |
| KR | 101236396 B1 | 2/2013 |
| KR | 101253155 B1 | 4/2013 |
| KR | 101267120 B1 | 5/2013 |
| KR | 101421346 B1 | 7/2014 |
| KR | 101462086 B1 | 11/2014 |
| KR | 101591579 B1 | 2/2016 |
| KR | 101840706 B1 | 3/2018 |
| KR | 101845872 B1 | 4/2018 |
| KR | 101848149 B1 | 5/2018 |
| KR | 20180123581 A | 11/2018 |
| KR | 20190010646 A | 1/2019 |
| KR | 102090763 B1 | 4/2020 |
| KR | 20210013049 A | 2/2021 |
| WO | 0067426 A2 | 11/2000 |
| WO | 2011046715 A2 | 4/2011 |
| WO | 2013103912 A1 | 7/2013 |
| WO | 2015025251 A1 | 2/2015 |
| WO | 2015112108 A1 | 7/2015 |
| WO | 2015171581 A1 | 11/2015 |
| WO | 2016018252 A1 | 2/2016 |
| WO | 2017214271 A1 | 12/2017 |
| WO | 2017217870 A1 | 12/2017 |
| WO | 2018085696 A2 | 5/2018 |
| WO | 2018122709 A1 | 7/2018 |
| WO | 2018125996 A1 | 7/2018 |
| WO | 2018189660 A1 | 10/2018 |
| WO | 2018209295 A1 | 11/2018 |
| WO | 2018213801 A1 | 11/2018 |
| WO | 2018235096 A1 | 12/2018 |
| WO | 2019023659 A1 | 1/2019 |
| WO | 2019149368 A1 | 8/2019 |
| WO | 2019157107 A1 | 8/2019 |
| WO | 2019168780 A1 | 9/2019 |
| WO | 2020104857 A1 | 5/2020 |
| WO | 2020123707 A1 | 6/2020 |
| WO | 2020145981 A1 | 7/2020 |
| WO | 2020180815 A1 | 9/2020 |
| WO | 2020185311 A1 | 9/2020 |
| WO | 2021016271 A2 | 1/2021 |
| WO | 2021133593 A1 | 7/2021 |
| WO | 2021191162 A1 | 9/2021 |
| WO | 2021247663 A2 | 12/2021 |

OTHER PUBLICATIONS

ETSI Multi-access Edge Computing (MEC), "UE Application Interface" ETSI GS MEC 016 V2.1.1 (Apr. 2019), 22 pages.

* cited by examiner

ENABLE INTERACTION BETWEEN A USER AND AN AGENT OF A 5G WIRELESS TELECOMMUNICATION NETWORK USING AUGMENTED REALITY GLASSES

CROSS-REFERENCE TO RELATED APPLICATIONS

This application is a continuation of U.S. patent application Ser. No. 17/843,469, filed on Jun. 17, 2022, entitled ENABLE INTERACTION BETWEEN A USER AND AN AGENT OF A 5G WIRELESS TELECOMMUNICATION NETWORK USING AUGMENTED REALITY GLASSES, which is hereby incorporated by reference in its entirety.

BACKGROUND

Users frequently rely on asynchronous messaging, such as chatting, to reach out to a representative of a company for help. Starting a chat conversation is straightforward and enables asynchronous text messaging between the user and the representative. Because of the asynchronous nature, however, chatting is a slow process and waiting for a response can take minutes. In addition, visual communication such as viewing a physical product or having a sense of face-to-face interaction is challenging. Similarly, the lack of visual communication makes validating the identity of the user difficult, and, consequently, asynchronous messaging is prone to fraud.

BRIEF DESCRIPTION OF THE DRAWINGS

Detailed descriptions of implementations of the present invention will be described and explained through the use of the accompanying drawings.

Figure 1:
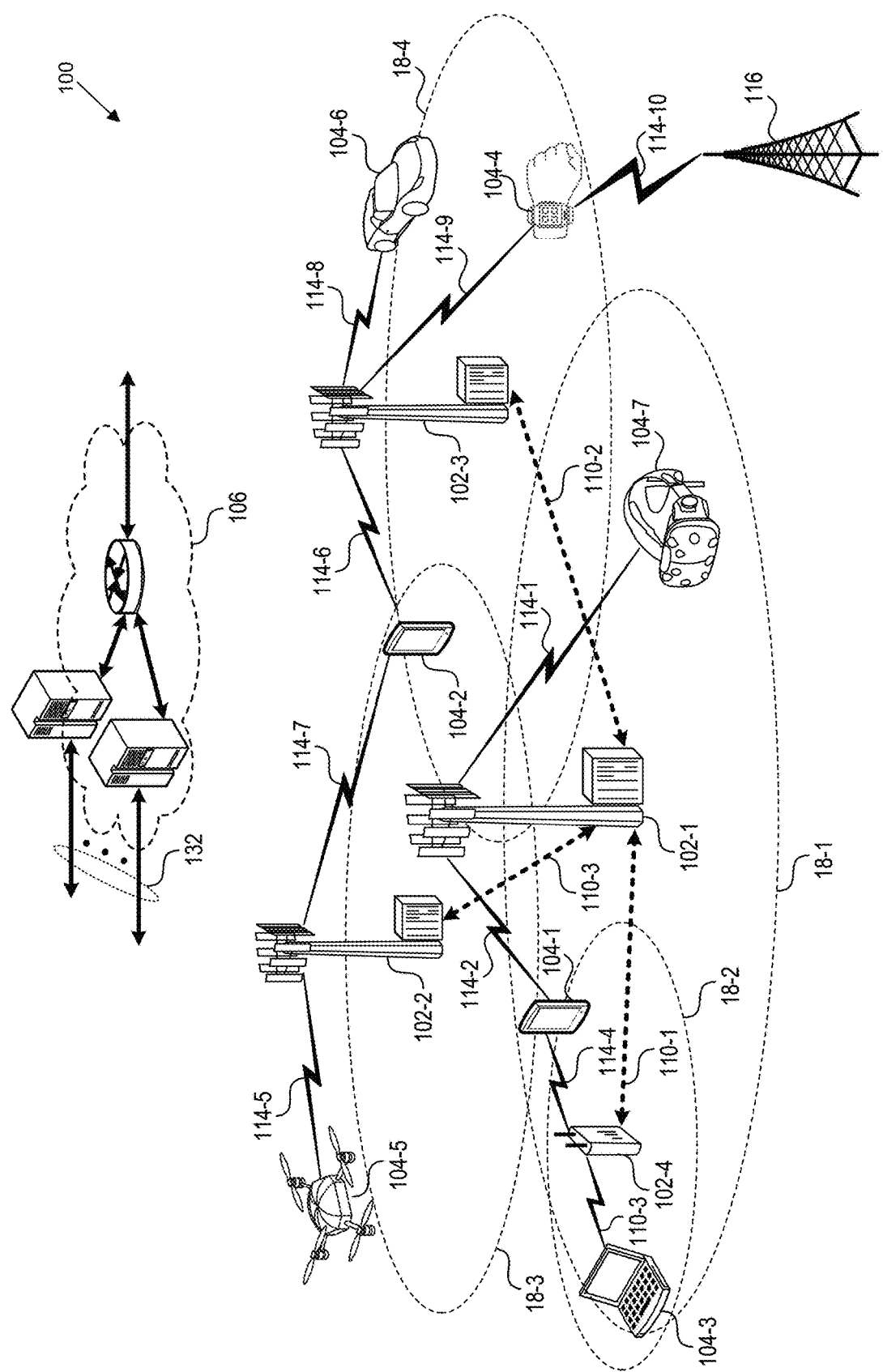
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system to enable interaction between augmented reality (AR) glasses associated with a user and AR glasses associated with an agent of a 5G wireless telecommunication network. The system can receive a request from the user to interact with the agent of the 5G wireless telecommunication network. The system can determine whether the user has AR glasses. For example, the application running on the AR glasses in communicating with the 5G wireless telecommunication network can detect the type of device that it is running on, and determine whether the device includes AR glasses.

The user's AR glasses includes a camera configured to capture an object proximate to the user's AR glasses. The user's AR glasses includes a display configured to show a virtual object or other image, which is not part of a physical surrounding associated with the user's AR glasses. A chat application running on the AR glasses associated with the user can automatically detect that the device running the chat application is the AR glasses connected to a high-speed network such as a 5G or higher generation wireless telecommunication network, or Wi-Fi. The chat application running on the AR glasses associated with the user can send a notification to the device associated with the agent that the user has the AR glasses. Upon determining that the user has AR glasses, the system can create a high-bandwidth communication channel over the 5G wireless telecommunication network between the user's AR glasses and the agent's AR glasses, where the high-bandwidth communication channel enables a communication bandwidth exceeding 100 Megabits per second (Mbps). The complete 360-degree frame of AR/VR application or immersive gaming needs to be sent at below than 20 millisecond lag. Consequently, high-end experience of VR and AR require over 100 Mbps. Upon determining that the user is associated with the user's AR glasses, the system can create a virtual room enabling the user and the agent to share visual information over the high-bandwidth communication channel.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (g NB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point. The NANs can include satellites.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
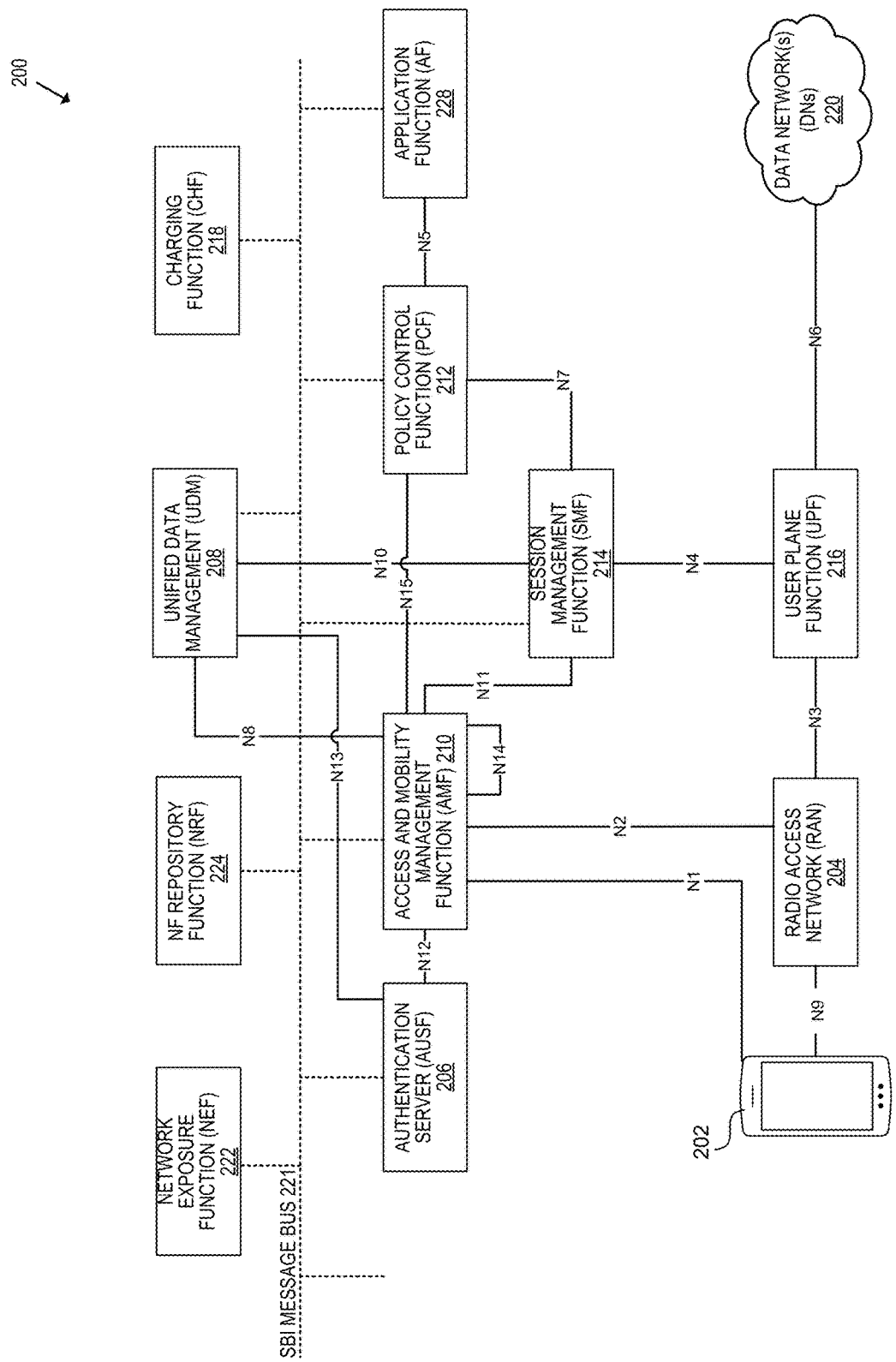
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP) (not shown).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), providing authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QoS) and charging rules, includes Network Slice selection, which is regulated by the NSSF 226.

Figure 3:
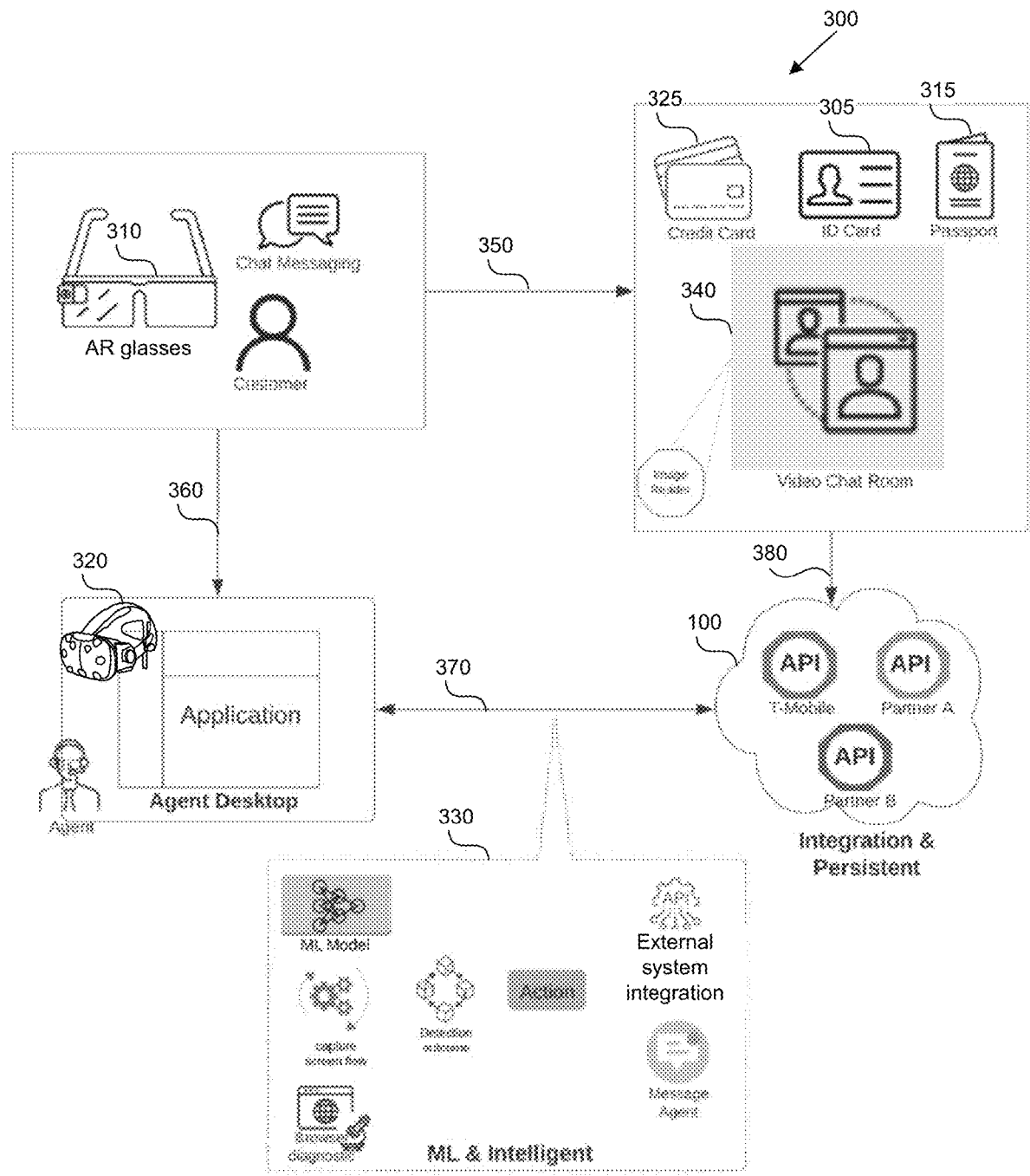
FIG. 3 shows a system to enable interaction between a user and an agent of a 5G wireless telecommunication network using an augmented reality (AR)/virtual reality (VR) device.

Enable Interaction Between a User and an Agent of a 5G Wireless Telecommunication Network Using Augmented Reality Glasses FIG. 3 shows a system to enable interaction between the user and the agent of a 5G wireless telecommunication network using an augmented reality (AR)/virtual reality (VR) device. The system 300 can include an AR/VR device 310 of the user, an AR/VR device 320 of the agent, the network 100, a software 330, and a virtual room 340.

The AR/VR device 310, 320 can be AR glasses or a virtual reality set including a head-mounted display and/or haptic feedback. The network 100 can be a 5G wireless telecommunication network or a higher generation wireless telecommunication network enabling creation of a high-bandwidth communication channel 350, 360, 370, 380 necessary for AR/VR, which can exceed 100 Mbps. The AR/VR device 310, 320 connected to the network 100 can be the UE of choice, replacing today's mobile devices because the AR/VR device can enable immersive visual communication in the virtual room 340 with others even if they are not in the same physical space. The participants of the virtual room 340 can show and demonstrate physical objects, which can aid troubleshooting, sales, and social interaction. Software 330 running inside the AR/VR device 310, 320 can analyze text or natural language conversation, or can capture and recognize an object. In the context of sales, the software 330 inside the AR/VR device 310, 320 can process sales transactions in real time without any manual intervention from either party. The software 330 can include a machine learning (ML) model, as noted below.

When both the user and the agent are using AR/VR devices 310, 320, they can have a more effective chat conversation, including an opportunity to engage in face-to-face chat or to show distant objects to each other. For example, if the user is trying to complete the purchase, the user can prove the user's identity by showing an ID card 305 or a passport book 315, as if the user were inside a retail store in front of a retail agent. The user can also show the user's credit card 325 to enable the agent to process the order without the need for the user to type the credit card information over a secured web form. The software 330 can extract relevant information from a recording, such as an image or video, of the credit card 325, thus eliminating manual entry of information. The agent can include a person or an artificial intelligence/ML model trained to interact with the user.

Figure 4:
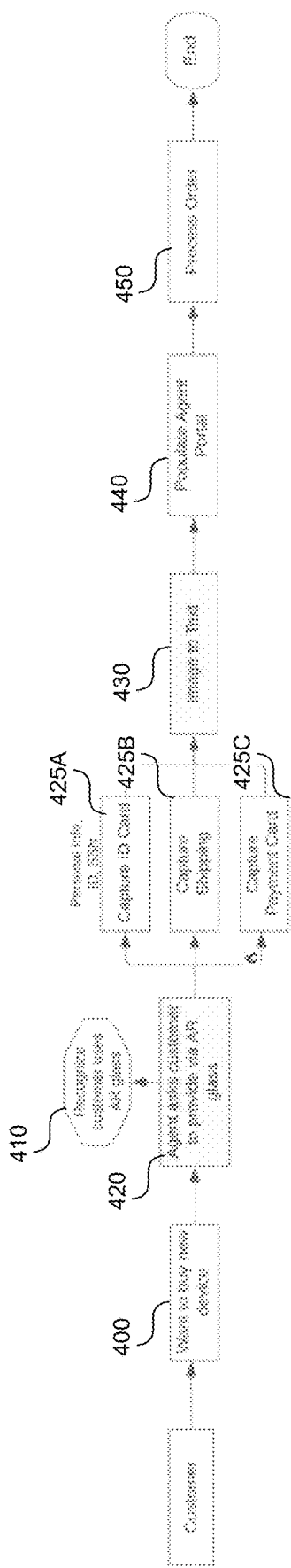
FIG. 4 shows a process to automatically capture personally identifiable information associated with the user.

FIG. 4 shows a process to automatically capture personally identifiable information associated with the user. In step 400, the AR/VR device associated with the user can send the request to purchase a new device to an agent associated with the network 100 in FIG. 1. In step 410, a chat application running on the AR/VR device associated with the user can automatically detect that the device running the chat application is the AR/VR device connected to a high-speed network such as a 5G or higher generation wireless telecommunication network, or Wi-Fi. The chat application running on the AR/VR device associated with the user can send a notification to the device associated with the agent that the user has the AR/VR device. The agent can choose whether to leverage the AR/VR device associated with the agent, or to use a traditional computer device to respond to the user.

Without AR/VR devices, the agent, using the asynchronous messaging, can send a secure web form for the user to complete manually. The user can describe aspects of the product the user wishes to purchase, and the agent can describe various products that may fit the user's needs. The communication between the parties is either text-based or 2D image-based. The agent can use collected data from the secure web form to process the user's product order.

In step 420, the device associated with the agent can request an identification and/or credit card information associated with the user. The AR/VR device associated with the user can capture a visual representation 425A, 425B, 425C such as an image or a video stream of the identification and/or the credit card information to the device associated with the agent. In step 430, the device associated with the agent can convert the received visual representation 425A-C to text. In step 440, the device can populate the agent portal with the converted text. After the agent verifies the converted text, in step 450, the device can complete the order. Using the disclosed system, the transaction can be completed in a matter of minutes, while, by comparison, the transaction can last several hours if conducted using an asynchronous chat.

Figure 5:
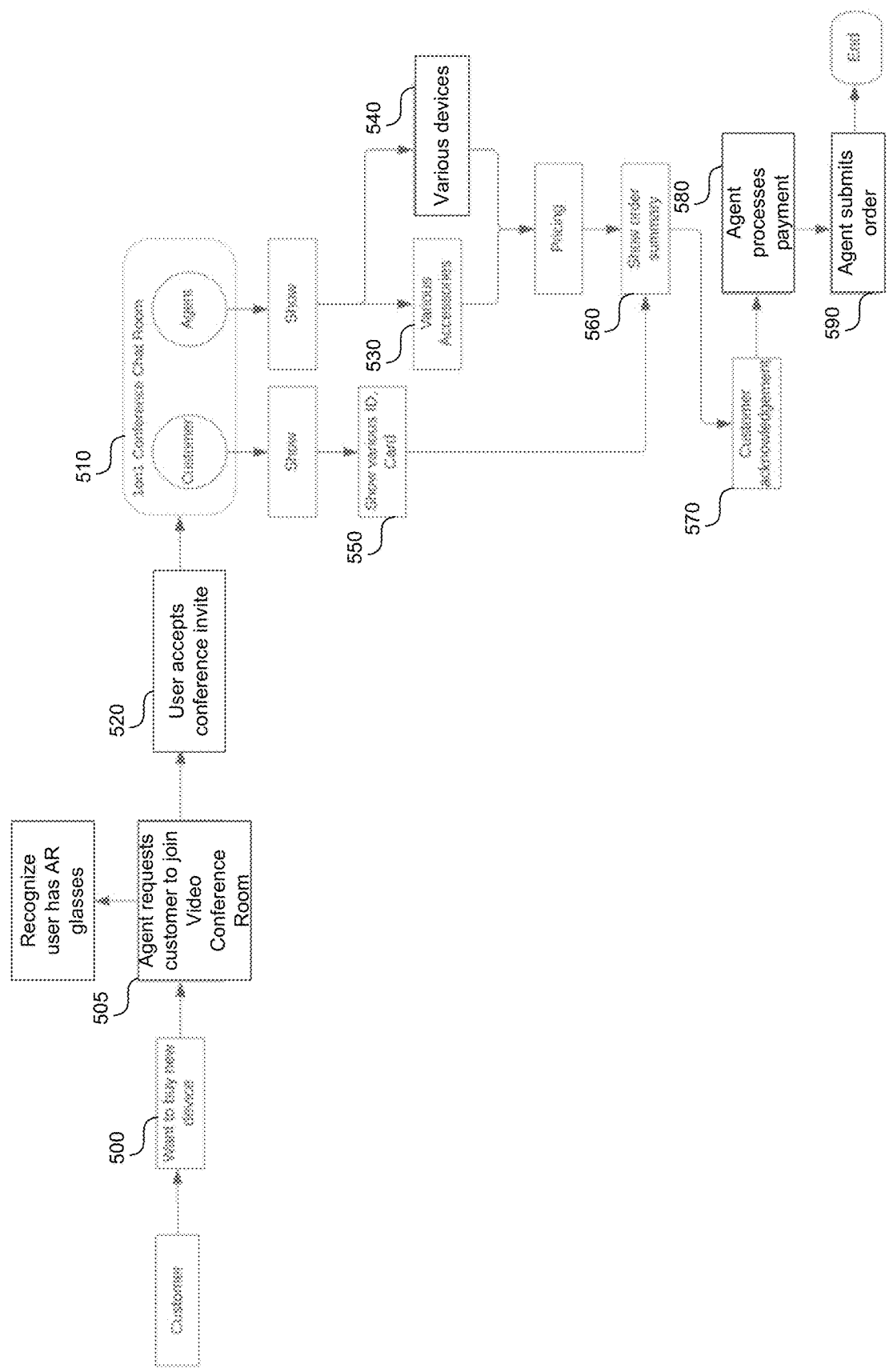
FIG. 5 shows a process to complete a sale in a virtual room.

FIG. 5 shows a process to complete a sale in a virtual room. In step 500, the user can indicate an interest in making a purchase. In step 505, the agent can invite the user to join a virtual room 510. In step 520, the user can accept the invitation. In the virtual room 510, the user and the agent can show a video of themselves, or the user and the agent can utilize avatars configured to indicate the behavior of the user and the agent, respectively.

In step 530, 540, the agent, using the AR/VR device of the agent, can show a video of the various devices, including accessories, that the user may be interested in purchasing. The user can request to see a particular aspect of a particular device, and the agent can present the particular aspect to the user, as if the user and the agent were in a retail store. Consequently, the user is confident that this is the device that the user wants to order. To complete the sale, in step 550, the user can present an ID and a credit card. The agent can visually inspect the identification and the credit card to ensure that the ID and the credit card match, thus reducing identity theft and credit card fraud. In step 560, the agent can share the agent's screen to show the purchase card, including the order summary. In step 570, the user can send the acknowledgment of the shopping cart. In step 580, the agent can process the payment. In step 590, the agent can submit the order. The disclosed purchase can be completed in a matter of minutes as compared to a matter of hours using traditional asynchronous messaging.

Figure 6:
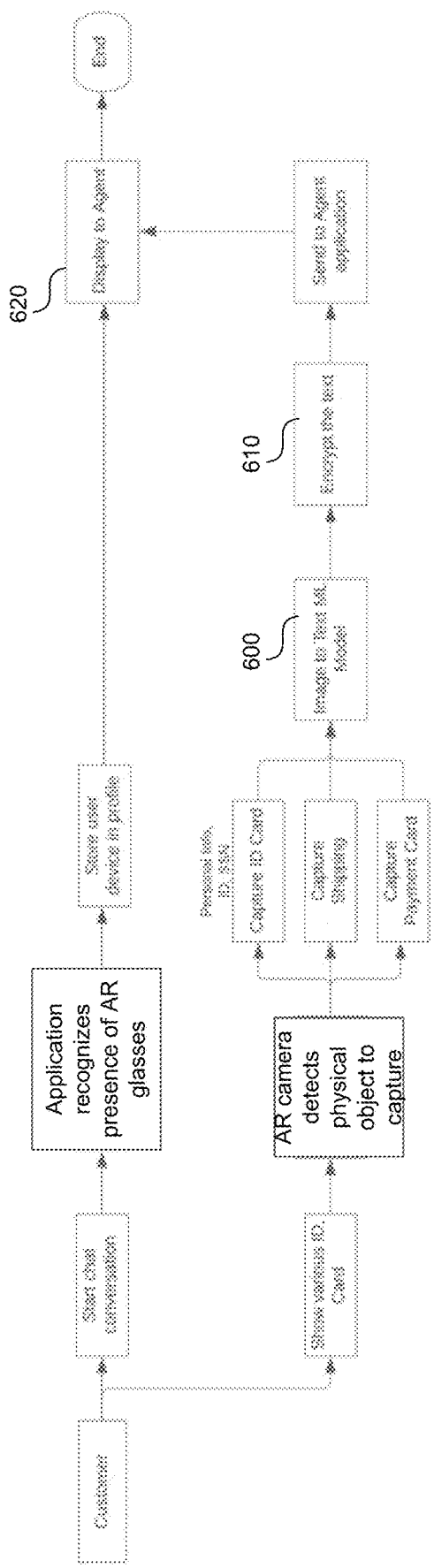
FIG. 6 shows encryption and the use of machine learning (ML) to convert images to text.

FIG. 6 shows encryption and the use of ML to convert images to text. In step 600, the ML model can receive the visual representation of the IDs and/or credit cards provided by the user and can convert the visual representation of the personally identifiable information to text. In step 610, the system can encrypt the text prior to sending the text to the agent. In step 620, the system can decrypt the received text and present the decrypted text to the agent.

Figure 7:
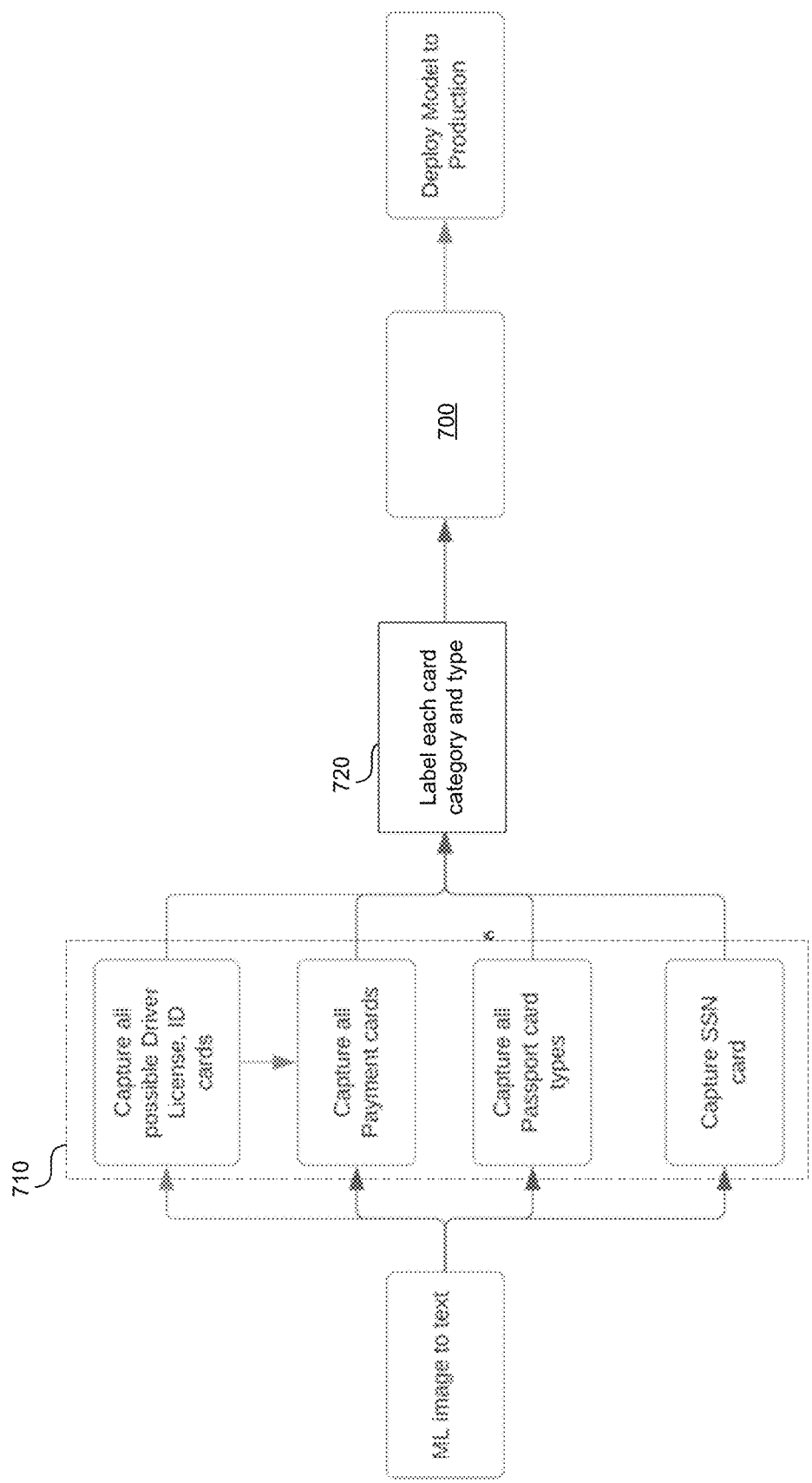
FIG. 7 shows the process of training the ML model to convert images to text.

FIG. 7 shows the process of training the machine learning model to convert images to text. The ML model 700 can receive training data 710 including ID cards, payment cards, passports, and Social Security cards. In step 720, the system can label each of the training data by the appropriate label, namely, ID card label, payment card label, passport label, or Social Security card label. The system can train the ML model 700 to correctly label any new data. In addition, the system can train the ML model 700 to extract personally identifiable information from the new data. Once the ML model 700 is trained, the system can deploy the ML model.

A "model," as used herein, refers to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, the ML model can be a neural network with multiple input nodes that receive visual representations of ID cards, payment cards, passports, and Social Security cards. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer ("the output layer"), one or more nodes can produce a value classifying the input that, once the model is trained, can be used as personally identifiable information. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A machine learning model can be trained with supervised learning, where the training data 710 includes ID cards, payment cards, passports, and Social Security cards as input and a desired output, such as personally identifiable information obtained from the input. A representation of training data 710 can be provided to the model. Output from the model can be compared to the desired output for that training data 710 and, based on the comparison, the model can be modified, such as by changing weights between nodes of the neural network or parameters of the functions used at each node in the neural network (e.g., applying a loss function). After applying each of the ID cards, payment cards, passports, and Social Security cards in the training data and modifying the model in this manner, the model can be trained to evaluate new input data.

Figure 8:
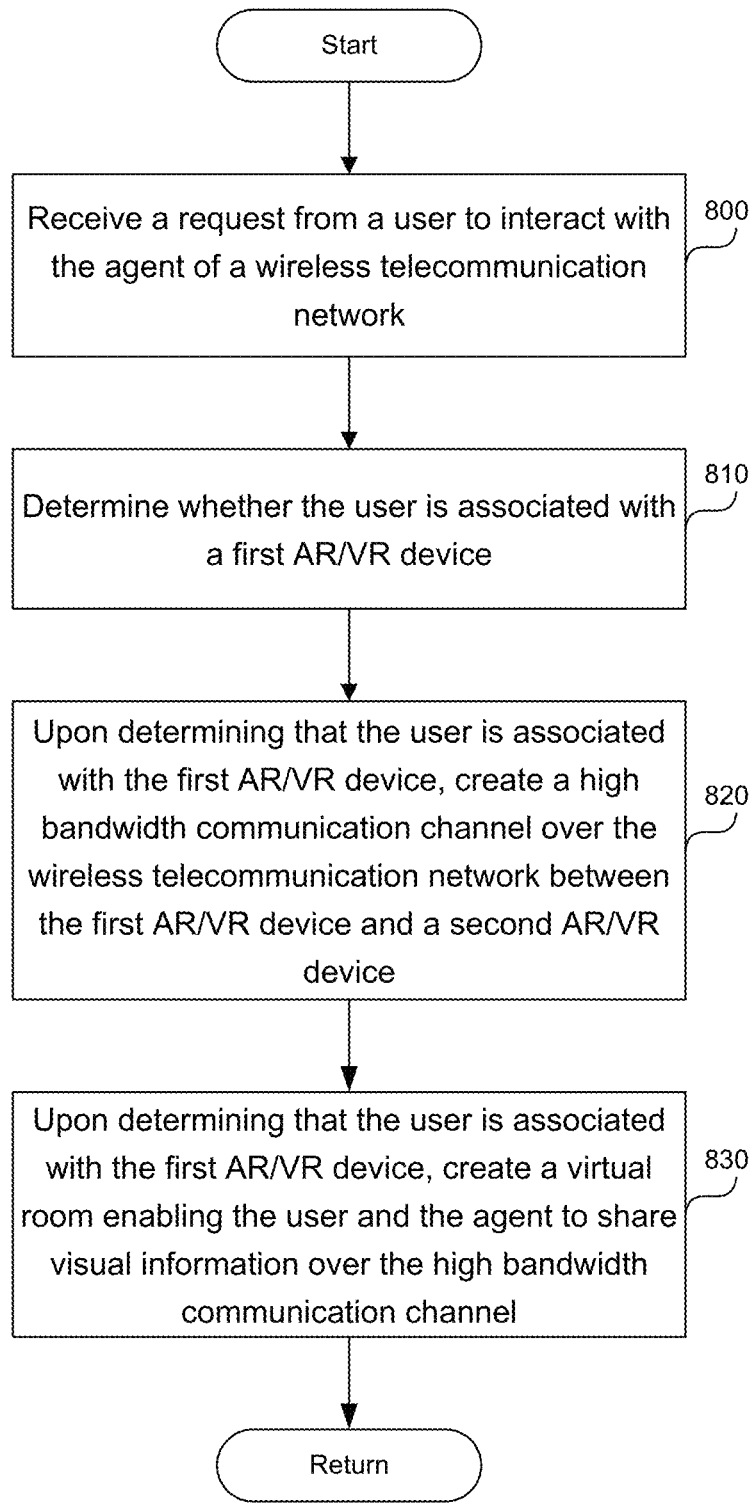
FIG. 8 is a flowchart of a method to enable interaction between a user and an agent of a 5G or higher generation wireless telecommunication network using AR/VR devices.

FIG. 8 is a flowchart of a method to enable interaction between a user and an agent of a 5G or higher generation wireless telecommunication network using AR/VR devices. In step 800, a hardware or software processor executing instructions described in this application can receive a request from a user to interact with the agent of a wireless telecommunication network. The wireless telecommunication network can include a 5G wireless telecommunication network or higher generation wireless telecommunication network because the bandwidth requirements to enable AR/VR communications require high bandwidth that can be provided by the 5G or higher generation wireless telecommunication network.

In step 810, the processor can determine whether the user is associated with a first AR/VR device. For example, the application running on the first AR/VR device in communicating with the wireless telecommunication network can detect the type of the device and determine whether the device is an AR/VR device. The first AR/VR device can include a camera configured to capture an object proximate to the first AR/VR device. The first AR/VR device can include a display configured to show a virtual object, where the virtual object is not part of a surrounding associated with the first AR/VR device.

In step 820, upon determining that the user is associated with the first AR/VR device, the processor can create a high-bandwidth communication channel over the wireless telecommunication network between the first AR/VR device and the second AR/VR device, where the high-bandwidth communication channel enables a communication bandwidth exceeding 100 Megabits per second (Mbps).

In step 830, upon determining that the user is associated with the first AR/VR device, the processor can create a virtual room enabling the user and the agent to share visual information over the high-bandwidth communication channel.

The processor can utilize the virtual room to prevent fraud by enabling the agent to visually examine information that the user is providing, such as proof of identity. For example, the processor can receive a second request from the user to perform an operation requiring an authentication. The operation can be a purchase or a sale. The processor can request a first identification associated with the user. The processor can cause the first AR/VR device to record a first visual representation of the first identification associated with the user. The first visual representation can be a video, an image, or a 3D rendering. The processor can extract from the first visual representation first personally identifiable information associated with the user. To extract the first personally identifiable information, the processor can scan the first visual representation and extract text, or the processor can read the barcode associated with the first visual representation and extract information from the barcode. The processor can request a second identification associated with the user. The processor can cause the first AR/VR device to record a second visual representation of the second identification associated with the user. The processor can extract from the second visual representation second personally identifiable information associated with the user. The processor can determine whether at least a first portion of the first personally identifiable information matches at least a second portion of the second personally identifiable information. To make the determination, the processor can compare the first portion and the second portion, or the agent can perform a visual check of the first portion of the personally identifiable information and the second portion of the personally identifiable information. The first portion and the second portion can include the name, Social Security number, and/or residence address, etc. Upon determining that the first portion of the first personally identifiable information matches the second portion of the second personally identifiable information, the processor can authenticate the user.

The processor can train an ML model to convert the visual representation to text. The processor can obtain training data configured to train an ML model. The training data can include an identification card associated with the user, a payment card associated with the user, a passport associated with the user, and a Social Security card associated with the user. The identification card can include a driver's license or student ID. The processor can label the training data using multiple labels including an identification card label, a payment card label, a passport label, and a Social Security card label, where each label corresponds to the appropriate training data. Based on the training data and the multiple labels, the processor can train the ML model to receive a visual representation, determine a particular label among the multiple labels associated with the visual representation, and extract information from the visual representation.

The processor can convert image to text, thus preventing fraud in cases when a user provides false information over asynchronous text messages. The processor can request an identification associated with the user. The processor can cause the first AR/VR device to record a visual representation of the identification associated with the user. The processor can extract from the visual representation personally identifiable information associated with the user. The processor can encrypt the personally identifiable information. The processor can send the encrypted personally identifiable information to the agent. The processor can decrypt the personally identifiable information. The processor can present the personally identifiable information to the agent.

The processor can use the virtual room to present a potential object of interest to the user. The processor can receive a request from the first AR/VR device to present an object of interest to the user. The second AR/VR device can capture a visual representation of the object of interest to the user. For example, the user may be interested in purchasing iPhone X, and the agent can hold the physical iPhone X and allow the second AR/VR device to record the iPhone X. Alternatively, the agent can request a photorealistic rendering of the iPhone X to be delivered to the first AR/VR device. The processor can send the visual representation to the first AR/VR device. The processor can share screens between the agent and the user and show the shopping cart to the user prior to purchase.

The processor can use the virtual room to aid in troubleshooting. For example, the processor can receive the request from the user to interact with the agent of the wireless telecommunication network. The request can include a troubleshooting assistance associated with a UE. The processor can cause the first AR/VR device to capture a visual representation of the UE. The processor can capture the screen of the UE or the UE using the video camera of the first AR/VR device. Alternatively, the UE in the first AR/VR device can be networked using near field communication and/or Wi-Fi, and the UE can send the UE device log, or the UE screen grab, to the first AR/VR device. The processor can cause the first AR/VR device to send the visual representation to the second AR/VR device. The processor can present, by the second AR/VR device, the visual representation.

The processor can use ML to convert an image to text. The processor can request an identification associated with the user. The processor can cause the first AR/VR device to record a visual representation of the identification associated with the user. The processor can identify, by an ML model, a type associated with the identification, where the type includes a driver's license, a Social Security card, a student identification, or a passport. Based on the type associated with the identification, the processor can extract, by the ML model, personally identifiable information from the visual representation.

The user and the agent can choose to present a video of themselves, or to present avatars in the virtual room. The processor can obtain an avatar associated with the user. The processor can present the avatar in the virtual room, where the avatar is configured to indicate behavior associated with the user.

The processor can prioritize network traffic associated with certain AR/VR calls. Upon receiving the request from the user to interact with the agent of the wireless telecommunication network, the processor can determine whether the request is a high-priority request. The high-priority request can include a request to disengage from the 5G wireless telecommunication network or a request to engage with the 5G wireless telecommunication network. Upon determining that the request is the high-priority request, the processor can provide higher bandwidth to network traffic carried by the wireless telecommunication network and associated with the request over other network traffic.

Figure 9:
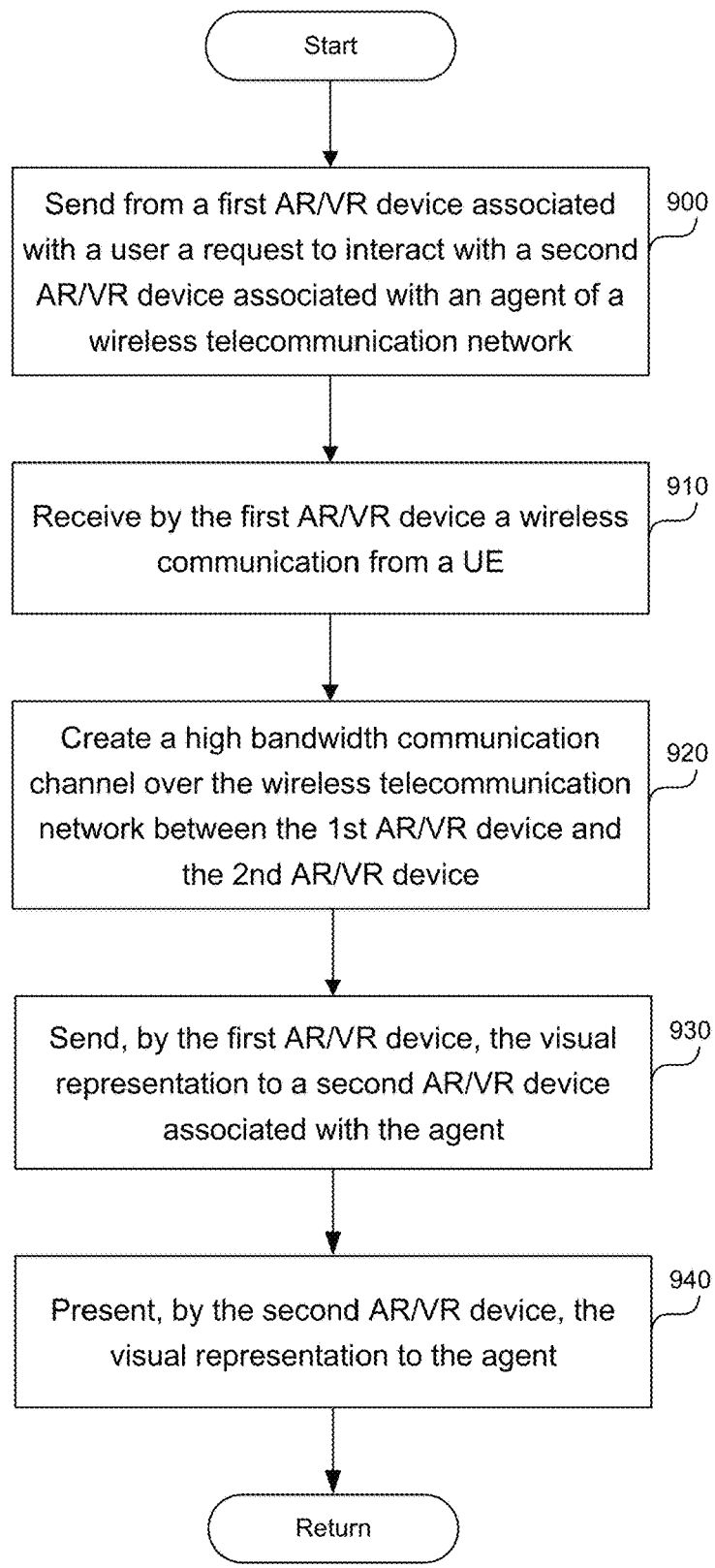
FIG. 9 is a flowchart of a method to troubleshoot a problem using AR/VR devices.

FIG. 9 is a flowchart of a method to troubleshoot a problem using AR/VR devices. In step 900, a processor can send from a first AR/VR device associated with a user a request to interact with a second AR/VR device associated with an agent of a wireless telecommunication network including a 5G wireless telecommunication network or higher generation wireless telecommunication network. The request can include a troubleshooting assistance associated with a UE. The UE can be different device from the first AR/VR device. The first AR/VR device and the UE are configured to communicate wirelessly with each other. The second AR/VR device can include a display configured to show a virtual object, which is not part of a surrounding associated with the second AR/VR device.

In step 910, the processor can receive by the first AR/VR device a wireless communication from the UE. The wireless communication can include a visual representation indicating an issue associated with the troubleshooting assistance, such as a screen grab.

In step 920, the processor can create a high-bandwidth communication channel over the wireless telecommunication network between the first AR/VR device and the second AR/VR device. The high-bandwidth communication channel can enable a communication bandwidth exceeding 100 Megabits per second (Mbps).

In step 930, the processor can send, by the first AR/VR device, the visual representation to a second AR/VR device associated with the agent. In step 940, the processor can present, by the second AR/VR device, the visual representation to the agent.

The processor can prevent fraud by providing visual verification of information provided by the user. The processor can send, by the first AR/VR device, a second request to perform an operation requiring an authentication. The operation can be a request to purchase a device. The processor can receive a request for a first identification associated with the user. The processor can record, by the AR/VR device, a first visual representation of the first identification associated with the user. The processor can cause an extraction of first personally identifiable information associated with the user from the first visual representation. The processor can receive a request for a second identification associated with the user. The processor can record, by the AR/VR device, a second visual representation of the second identification associated with the user. The processor can cause an extraction of second personally identifiable information associated with the user from the second visual representation. The processor can cause a determination of whether at least a first portion of the first personally identifiable information matches at least a second portion of the second personally identifiable information. Upon determining that the first portion of the first personally identifiable information matches the second portion of the second personally identifiable information, the processor can receive an indication that the user has been authenticated.

Computer System

Figure 10:
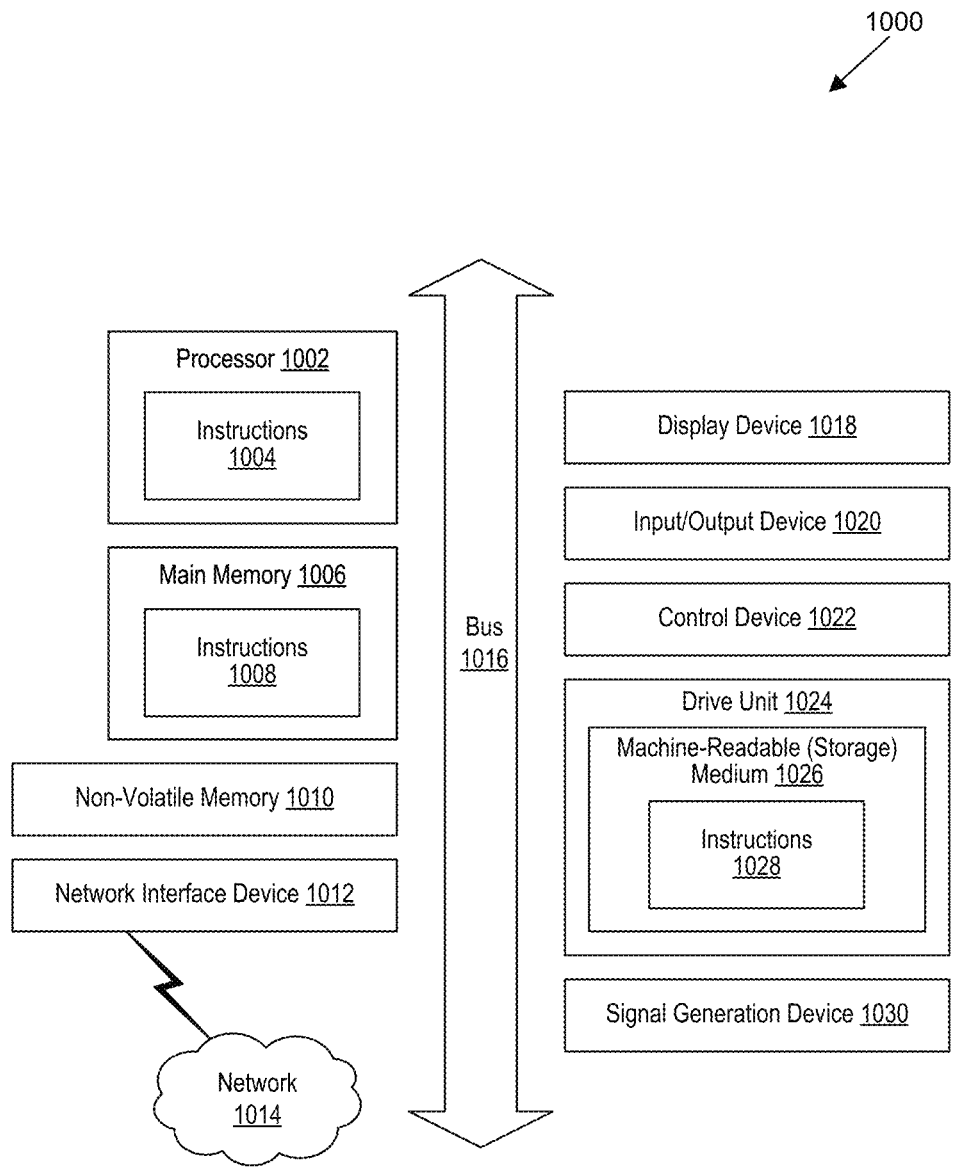
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a storage medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the Figures and any other components described in this specification can be implemented.

The computer system 1000 can take any suitable physical form. For example, the computer system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer system (SBC), or a distributed system such as a mesh of computer systems, or it can include one or more cloud components in one or more networks. Where appropriate, one or more computer systems 1000 can perform operations in real time, near real time, or in batch mode.

The network interface device 1012 enables the computer system 1000 to mediate data in a network 1014 with an entity that is external to the computer system 1000 through any communication protocol supported by the computer system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computer system 1000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. At least one computer-readable storage medium, excluding transitory signals and carrying instructions, which, when executed by at least one data processor of a system, cause the system to:
    receive a request from a first user to interact with a second user of a wireless telecommunication network,
        wherein the wireless telecommunication network includes a 5G wireless telecommunication network or higher generation wireless telecommunication network;
    determine whether the first user is associated with a first AR/VR device,
        wherein the first AR/VR device includes a camera configured to capture an object proximate to the first AR/VR device,
        wherein the first AR/VR device includes a display configured to show a virtual object, and
        wherein the virtual object is not part of a surrounding associated with the first AR/VR device;
    upon determining that the first user is associated with the first AR/VR device, create a high-bandwidth communication channel over the wireless telecommunication network between the first AR/VR device and a second AR/VR device associated with the second user of the wireless telecommunication network,
        wherein the high-bandwidth communication channel is configured to support a virtual room enabling the first user and the second user to share visual information over the high-bandwidth communication channel.

2. The computer-readable storage medium of claim 1, comprising instructions to:
    receive a second request from the first user to perform an operation requiring an authentication;
    request a first identification associated with the first user;
    cause the first AR/VR device to record a first visual representation of the first identification associated with the first user;
    extract from the first visual representation first personally identifiable information associated with the first user;
    request a second identification associated with the first user;
    cause the first AR/VR device to record a second visual representation of the second identification associated with the first user;
    extract from the second visual representation second personally identifiable information associated with the first user;
    determine whether at least a first portion of the first personally identifiable information matches at least a second portion of the second personally identifiable information; and
    upon determining that the first portion of the first personally identifiable information matches the second portion of the second personally identifiable information, authenticate the first user.

3. A system comprising:
    at least one hardware processor; and
    at least one non-transitory memory storing instructions, which, when executed by the at least one hardware processor, cause the system to:
        receive a request from a first user to interact with a second user of a wireless telecommunication network,
            wherein the wireless telecommunication network includes a 5G wireless telecommunication network or higher generation wireless telecommunication network;
        determine whether the first user is associated with a first AR/VR device,
            wherein the first AR/VR device includes a camera configured to capture an object proximate to the first AR/VR device, wherein the first AR/VR device includes a display configured to show a virtual object, and
wherein the virtual object is not part of a surrounding associated with the first AR/VR device;
upon determining that the first user is associated with the first AR/VR device, create a high-bandwidth communication channel over the wireless telecommunication network between the first AR/VR device and a second AR/VR device associated with the second user of the wireless telecommunication network,
wherein the high-bandwidth communication channel is configured to support a virtual room enabling the first user and the second user to share visual information over the high-bandwidth communication channel.

4. The system of claim 3, comprising instructions to:
receive a second request from the first user to perform an operation requiring an authentication;
request a first identification associated with the first user;
cause the first AR/VR device to record a first visual representation of the first identification associated with the first user;
extract from the first visual representation first personally identifiable information associated with the first user;
request a second identification associated with the first user;
cause the first AR/VR device to record a second visual representation of the second identification associated with the first user;
extract from the second visual representation second personally identifiable information associated with the first user;
determine whether at least a first portion of the first personally identifiable information matches at least a second portion of the second personally identifiable information; and
upon determining that the first portion of the first personally identifiable information matches the second portion of the second personally identifiable information, authenticate the first user.

5. The system of claim 3, comprising instructions to:
obtain training data configured to train a machine learning (ML) model,
wherein the training data includes at least two of: an identification card associated with the first user, a payment card associated with the first user, a passport associated with the first user, or a Social Security card associated with the first user;
label the training data using multiple labels,
wherein a label among the multiple labels includes an identification card label, a payment card label, a passport label, or a Social Security card label; and
based on the training data and the multiple labels, train the ML model to receive a visual representation, determine a particular label among the multiple labels associated with the visual representation, and extract information from the visual representation.

6. The system of claim 3, comprising instructions to:
request an identification associated with the first user;
cause the first AR/VR device to record a visual representation of the identification associated with the first user;
extract from the visual representation personally identifiable information associated with the first user;
encrypt the personally identifiable information;
send the encrypted personally identifiable information to an agent;
decrypt the personally identifiable information; and
present the personally identifiable information to the agent.

7. The system of claim 3, comprising instructions to:
receive a request from the first AR/VR device to present an object of interest to the first user;
capture, by the second AR/VR device, a visual representation of the object of interest to the first user; and
send the visual representation to the first AR/VR device.

8. The system of claim 3, comprising instructions to:
receive the request from the first user to interact with an agent of the wireless telecommunication network,
wherein the request includes a troubleshooting assistance associated with a UE;
cause the first AR/VR device to capture a visual representation of the UE;
cause the first AR/VR device to send the visual representation to the second AR/VR device; and
present, by the second AR/VR device, the visual representation.

9. The system of claim 3, comprising instructions to:
request an identification associated with the first user;
cause the first AR/VR device to record a visual representation of the identification associated with the first user;
identify, by a machine learning (ML) model, a type associated with the identification,
wherein the type includes a driver's license, a Social Security card, a student identification, or a passport; and
based on the type associated with the identification, extract, by the ML model,
personally identifiable information from the visual representation.

10. The system of claim 3, comprising instructions to:
obtain an avatar associated with the first user; and
present the avatar in the virtual room,
wherein the avatar is configured to indicate behavior associated with the first user.

11. The system of claim 3, comprising instructions to:
upon receiving the request from the first user to interact with an agent of the wireless telecommunication network, determine whether the request is a high-priority request,
wherein the high-priority request includes a request to disengage from the 5G wireless telecommunication network or a request to engage with the 5G wireless telecommunication network; and
upon determining that the request is the high-priority request, provide higher bandwidth to network traffic carried by the wireless telecommunication network and associated with the request over other network traffic.

12. A method comprising:
receiving a request from a first user to interact with a second user of a wireless telecommunication network,
wherein the wireless telecommunication network includes a 5G wireless telecommunication network or higher generation wireless telecommunication network;
determining whether the first user is associated with a first AR/VR device,
wherein the first AR/VR device includes a camera configured to capture an object proximate to the first AR/VR device,
wherein the first AR/VR device includes a display configured to show a virtual object, and
wherein the virtual object is not part of a surrounding associated with the first AR/VR device;

upon determining that the first user is associated with the first AR/VR device, creating a high-bandwidth communication channel over the wireless telecommunication network between the first AR/VR device and a second AR/VR device associated with the second user of the wireless telecommunication network,
  wherein the high-bandwidth communication channel is configured to support a virtual room enabling the first user and the second user to share visual information over the high-bandwidth communication channel.

13. The method of claim 12, comprising:
sending, by the first AR/VR device, a second request to perform an operation requiring an authentication;
receiving a request for a first identification associated with the first user;
recording, by the first AR/VR device, a first visual representation of the first identification associated with the first user;
causing an extraction of first personally identifiable information associated with the first user from the first visual representation;
receiving a request for a second identification associated with the first user;
recording, by the first AR/VR device, a second visual representation of the second identification associated with the first user;
causing an extraction of second personally identifiable information associated with the first user from the second visual representation;
causing a determination of whether at least a first portion of the first personally identifiable information matches at least a second portion of the second personally identifiable information; and
upon determining that the first portion of the first personally identifiable information matches the second portion of the second personally identifiable information, receiving an indication that the first user has been authenticated.

14. The method of claim 12, comprising:
obtaining training data configured to train a machine learning (ML) model,
  wherein the training data includes an identification card associated with the first user, a payment card associated with the first user, a passport associated with the first user, and a Social Security card associated with the first user;
labeling the training data using multiple labels,
  wherein a label among the multiple labels includes an identification card label, a payment card label, a passport label, and a Social Security card label; and
based on the training data and the multiple labels, train the ML model to receive a visual representation, determining a particular label among the multiple labels associated with the visual representation, and extract information associated with the visual representation.

15. The method of claim 12, comprising:
requesting an identification associated with the first user;
causing the first AR/VR device to record a visual representation of the identification associated with the first user;
extracting from the visual representation personally identifiable information associated with the first user;
encrypting the personally identifiable information;
sending the encrypted personally identifiable information to an agent;
decrypting the personally identifiable information; and
presenting the personally identifiable information to the agent.

16. The method of claim 12, comprising:
receiving a request from the first AR/VR device to present an object of interest to the first user;
capturing, by the second AR/VR device, a visual representation of the object of interest to the first user; and
sending the visual representation to the first AR/VR device.

17. The method of claim 12, comprising:
receiving the request from the first user to interact with an agent of the 5G wireless telecommunication network,
  wherein the request includes a troubleshooting assistance associated with a UE;
causing the first AR/VR device to capture a visual representation of the UE;
causing the first AR/VR device to send the visual representation to the second AR/VR device; and
presenting, by the second AR/VR device, the visual representation.

18. The method of claim 12, comprising:
requesting an identification associated with the first user;
causing the first AR/VR device to record a visual representation of the identification associated with the first user;
identifying, by a machine learning (ML) model, a type associated with the identification,
  wherein the type includes a driver's license, a Social Security card, a student identification, or a passport; and
based on the type associated with the identification, extracting, by the ML model, personally identifiable information from the visual representation.

19. The method of claim 12, comprising:
obtaining an avatar associated with the first user; and
presenting the avatar in the virtual room,
  wherein the avatar is configured to indicate behavior associated with the first user.

20. The method of claim 12, comprising:
upon receiving the request from the first user to interact with an agent of the 5G wireless telecommunication network, determining whether the request is a high-priority request,
  wherein the high-priority request includes a request to disengage from the 5G wireless telecommunication network or a request to engage with the 5G wireless telecommunication network; and
upon determining that the request is the high-priority request, providing higher bandwidth to network traffic carried by the 5G wireless telecommunication network and associated with the request over other network traffic.

* * * * *